June 3, 1958 R. A. CAMPBELL 2,837,646

COHERENT DETECTOR CIRCUIT

Filed Oct. 24, 1955

RICHARD A. CAMPBELL,
INVENTOR

BY Henry Heyman
ATTORNEY 2,837,646
Patented June 3, 1958

2,837,646

COHERENT DETECTOR CIRCUIT

Richard Alden Campbell, Los Angeles, Calif., assignor to Hughes Aircraft Company, Culver City, Calif., a corporation of Delaware Application October 24, 1955, Serial No. 542,210

13 Claims. (Cl. 250—27)

Figures 1, 2:
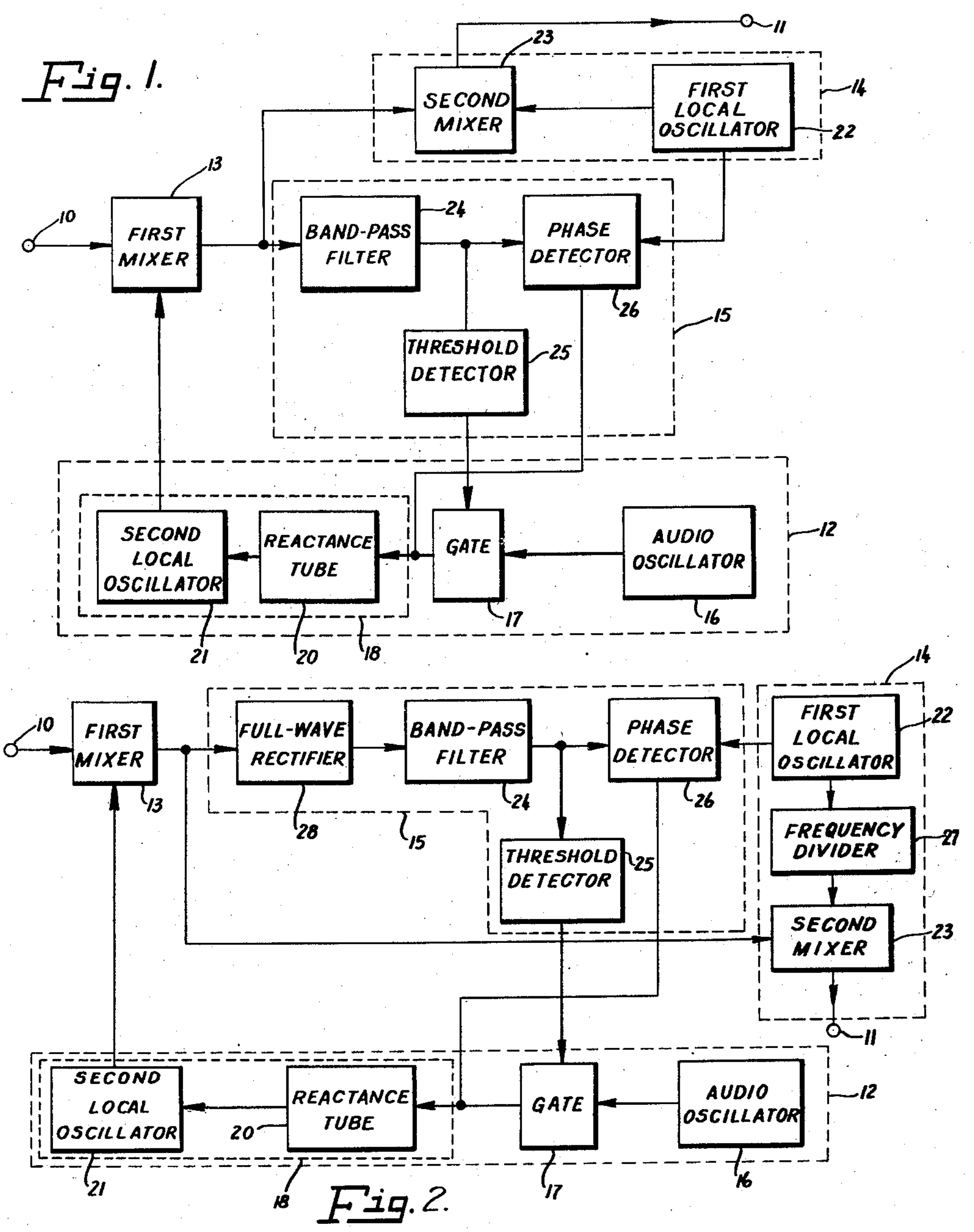

The present invention relates generally to demodulator circuits, and more particularly relates to a coherent detector type of demodulator circuit that searches for and automatically locks in on signals received within a band of frequencies.

Noise interference has been and continues to be a major problem in the field of communications. One solution to this problem lies in the use of the technique known as coherent detection. Basically, in this system an incoming message signal is heterodyned against a sweep signal to produce an intermediate-frequency signal whose frequency becomes equal at some instant to that of a locally generated reference signal, the intermediate-frequency signal and the reference signal then being heterodyned against each other to produce an output signal representing the information contained in the message signal.

Coherent detection has proven to be especially advantageous in improving signal-to-noise ratios where the message signals are pulse coded. For example, when a low signal-to-noise ratio already exists, linear addition of $n$ coherently detected pulses improves the signal-to-noise ratio to twice the number of decibels that would be achieved by a linear addition of $n$ linearly detected pulses.

Coherent detector circuits found in the prior art primarily use automatic frequency control for bringing the frequency of the intermediate-frequency signal to that of the reference signal. More specifically, the frequency of the intermediate-frequency signal is compared with the frequency of the reference signal in a frequency comparator or detector circuit which produces a control signal whose voltage amplitude is proportional to the difference in frequency between the two signals. The control signal is then used to vary the frequency of the intermediate-frequency signal until it is equal to that of the reference signal.

Although the frequency of the intermediate-frequency signal is made identical with that of the reference signal, the signals very often remain considerably out of phase with each other. It will be recognized by those skilled in the art that this phase discrepancy will be introduced into the output signal and that, as a result, the output signal may not faithfully represent the information contained in the received message signal.

It is, therefore, an object of the present invention to provide a coherent detector circuit that automatically searches for and locks in on message signals received within a prescribed band of frequencies.

It is another object of the present invention to provide a coherent detector circuit that reduces the interfering effects of noise by increasing the signal-to-noise ratio of received message signals.

It is a further object of the present invention to provide a coherent detector circuit that eliminates the possibility of phase distortion in the output signal by bringing the intermediate-frequency signal into proper phase relation with the reference signal.

The present invention overcomes the above and other disadvantages of coherent detector circuits found in the prior art by providing unique means for automatically searching and locking in on received signals. More particularly, according to the basic concept of the present invention, a message signal received at any carrier frequency lying within a predetermined band of frequencies is heterodyned against a first sweep signal to produce a second sweep signal which at some instant during its sweep has a predetermined intermediate frequency that is either equal to or some multiple of the frequency of a locally generated reference signal. The second sweep signal, at the instant it has the predetermined intermediate frequency, is then used to produce a first control signal that locks the second sweep signal at the predetermined intermediate frequency and, together with the reference signal, is used to produce a second control signal that adjusts the phase of the second sweep signal until it is in proper relation to the phase of the reference signal. The second sweep and reference signals are then heterodyned against each other to produce an output signal that faithfully represents the information contained in the message signal.

The novel features which are believed to be characteristic of the invention, both as to its organization and method of operation, together with further objects and advantages thereof, will be better understood from the following description considered in connection with the accompanying drawing in which two embodiments of the invention are illustrated by way of example. It is to be expressly understood, however, that the drawing is for the purpose of illustration and description only, and is not intended as a definition of the limits of the invention.

Fig. 1 is a block diagram of a coherent detector circuit, according to the present invention, adapted for use in connection with message signals received on a particular carrier frequency; and Fig. 2 is a block diagram of a coherent detector circuit, according to the present invention, adapted for use in connection with double side-band suppressed carrier message signals.

Referring now to the drawing, wherein like reference characters designate like or corresponding parts throughout the several views, there is shown in Fig. 1 a coherent detector circuit, according to the present invention, that searches for message signals transmitted within a predetermined range of frequencies, each message signal having an associated carrier frequency, and automatically locks in on a message signal received at an input terminal 10 to produce an output signal at an output terminal 11 representing information contained in the message signal.

The coherent detector circuit comprises four basic circuit elements, namely, a sweep generator circuit 12 for generating a first sweep signal, a first mixer circuit 13 electrically connected to sweep generator circuit 12 and input terminal 10 for heterodyning the received message signal against the first sweep signal to produce a second sweep signal, a synchronous detector circuit 14 electrically connected to first mixer circuit 13 for demodulating the second sweep signal and for generating a reference signal, and a lock-in circuit 15 electrically connected between mixer circuit 13 and detector circuit 14 and electrically connected to sweep generator circuit 12. The lock-in circuit 15 is responsive to the second sweep signal produced by first mixer circuit 13 and to the reference signal developed by detector circuit 14 to produce first and second control signals that fix the first sweep signal at a predetermined frequency and phase, respectively, thereby causing the second sweep signal to be fixed at a predetermined frequency and phase.

Sweep generator circuit 12 comprises an audio oscillator 16, a gating circuit 17 and oscillator means 18, the gating circuit being electrically connected between the audio oscillator and the oscillator means. Gating circuit 17 is normally open for passing the audio signal generated by audio oscillator 16 and, in response to the first of the two control signals previously mentioned, is closed for preventing the passing of the audio signal. A gating circuit that may be utilized in sweep generator circuit 12 is shown and described on pages 603 and 604 of "Radio Engineering" by Frederick E. Terman, published in 1947 by the McGraw-Hill Book Company, Inc., New York. Oscillator means 18 is responsive to the audio signal passed by the gating circuit to generate a frequency modulated signal, hereafter referred to as a sweep signal, and includes a reactance tube 20 and a second local oscillator 21, the reactance tube being electrically coupled between the tank circuit of local oscillator 21 and gating circuit 17. Oscillator means of the type described is explained on pages 493 through 495 of the book entitled "Radio Engineering" mentioned above.

The two input terminals of first mixer circuit 13 are electrically connected to input terminal 10 and second local oscillator 21. A mixer circuit that may be utilized in the coherent detector circuit of the present invention is shown and described on page 528 of the book entitled "Radio Engineering" referred to above.

Synchronous detector circuit 14 comprises a first local oscillator circuit 22 and a second mixer circuit 23, the second mixer circuit being electrically connected between first local oscillator circuit 22 and first mixer circuit 13. The output end of second mixer circuit 23 is connected to output terminal 11 where the output signal representing the information contained in the received message signal is produced. A synchronous detector that may be adapted for use in the circuit of the present invention is shown on page 285 of an article entitled "Theory of synchronous demodulator as used in NTSC color television receiver" by Donald C. Livingston in "Proceedings of the I. R. E.," January 1954.

Lock-in circuit 15 comprises a narrow band-pass filter 24 for passing the second sweep signal only when the sweep signal is produced at a predetermined first intermediate signal, as will be described more fully below. A narrow band-pass filter that may be adapted for use in the circuit of the present invention is shown and described on pages 129 through 134 of the book entitled, "Communication Circuits" by Lawrence A. Ware and Henry R. Reed, published in 1947 by John Wiley & Sons, Inc., New York. A threshold detector circuit 25 is electrically connected between filter 24 and gating circuit 17 and, in response to the second sweep signal passed by the filter, produces a first control signal which is applied to the gating circuit. A circuit commonly known as a Schmitt trigger circuit may readily be used as a threshold detector 25. An example of a Schmitt trigger circuit that may be utilized will be found on pages 57 through 59 of "Time Bases," by O. S. Puckle, published in 1943 by John Wiley and Sons, Inc., New York.

Lock-in circuit 15 also includes a phase detector circuit 26 electrically connected at its input ends between filter circuit 24 and first local oscillator 22 and electrically connected at its output end to reactance tube 20. The phase detector compares the phases of the second sweep and reference signals to produce a second control signal which is applied to the reactance tube, the amplitude of the second control signal corresponding to the difference in phase between the two signals. A phase detector circuit, sometimes called a phase comparator circuit or phasemeter, that may be adapted for use in the circuit of the present invention is shown and described on pages 483 through 486 of the book entitled, "Electron-tube Circuits" by Samuel Seely, published in 1950 by the McGraw-Hill Book Company, Inc., New York.

In operation, audio oscillator 16 generates an audio signal at a predetermined or fixed audio frequency, the audio signal being applied to gating circuit 17 which is normally open. Consequently, the audio signal is passed to reactance tube 20 wherein the current circulating through the reactance tube is varied in accordance with the voltage amplitude of the audio signal. The impedance of the tank circuit of oscillator 21 is affected thereby, the change in impedance causing the oscillator to produce a first sweep signal whose frequency normally periodically varies through a first predetermined band of frequencies from $f_1$ to $f_2$. The first sweep signal is applied to first mixer circuit 13 and, as previously mentioned, the mixer circuit heterodynes the received message signal against the first sweep signal to produce a second sweep signal whose frequency normally periodically varies through a second predetermined band of frequencies from $f_3$ to $f_4$. At some instant during its sweep or scan of frequencies between $f_3$ and $f_4$, the second sweep signal has a first predetermined intermediate frequency $f_5$.

The second sweep signal is applied to filter circuit 24 and, when the sweep signal is at the first intermediate frequency $f_5$, the signal is passed by the filter to threshold detector circuit 25 which, in response thereto, produces a first control signal that is applied to gating circuit 17. The first control signal closes gating circuit 17 so that the audio signal generated by audio oscillator 16 is prevented from passing through to reactance tube 20. As a result, the impedance of the tank circuit of second local oscillator 21 is prevented from further variation and the frequency of the first sweep signal is thereby fixed. It will readily be recognized that fixing the frequency of the first sweep signal will also fix the frequency of the second sweep signal. Furthermore, since the action just described occurs almost instantaneously, the first sweep signal is fixed at that frequency $f_6$ that will cause the frequency of the second sweep signal to be fixed at the first intermediate frequency $f_5$.

The second sweep signal fixed at the first intermediate frequency $f_5$ is also applied to one input end of phase detector circuit 26. Simultaneously, the reference signal generated by first local oscillator 22 is applied to the other input end of phase detector circuit 26, the frequency of the reference signal being fixed at the first intermediate frequency, namely, $f_5$. Phase detector circuit 26 compares the phase of the second sweep signal relative to the reference signal and, in response thereto, produces a second control signal whose voltage amplitude and sense corresponds to the difference in phase between the two signals. The second control signal is applied to reactance tube 20 and, in response thereto, the phase of the first sweep signal is altered in accordance with the voltage amplitude and sense of the second control signal. It will be recognized that any change in the phase of the first sweep signal will be accompanied by a corresponding change in the phase of the second sweep signal produced by first mixer circuit 13. Accordingly, the phase of the second sweep signal is altered until it exactly matches that of the reference signal, at which time the voltage amplitude of the second control signal is reduced to zero. Thereafter, no further variations occur in the phase of any of these signals.

The second sweep signal from first mixer circuit 13 and the reference signal developed by first oscillator 22 are simultaneously applied to second mixer circuit 23 which heterodynes one signal against the other. Since the frequency and phase of the second sweep and reference signals are now identical, the mixer circuit is thereby able to produce an output signal at output terminal 11 that faithfully represents the information contained in the received message signal. In other words, the second sweep signal produced at the first intermediate frequency $f_5$ is demodulated by synchronous detector circuit 14, whereby the demodulated output signal is produced at output terminal 11.

It should be obvious that since the carrier wave, reduced to an intermediate-frequency wave, is available in a filtered form, it may be amplified and then used to beat the second sweep signal to a zero center frequency thereby to obtain a coherent detection rather than the locally generated reference signal. In this case, that is, if the filtered intermediate-frequency wave is used, the process is known as exalted carrier detection.

The circuit shown in Fig. 1 has been described in connection with message signals transmitted on carrier waves. However, the circuit may be modified as shown in Fig. 2 for reception of double side-band suppressed carrier message signals, that is, message signals in which the carrier frequency has been suppressed leaving, therefore, only the side-band frequency components in the message signals. In this case, a signal at twice the suppressed carrier frequency is artificially produced in the lock-in circuit by full-wave recification and the reference signal is generated at twice the suppressed carrier frequency. However, detection is accomplished at one-half the frequency of the locally generated reference signal.

More particularly, referring to Fig. 2, there is shown a coherent detector circuit comprising a sweep generator circuit 12, a first mixer circuit 13, a synchronous detector circuit 14 and a lock-in circuit 15. Sweep generator circuit 12 and mixer circuit 13 are identical to the sweep generator and mixer circuits shown in Fig. 1. Accordingly, these circuits have previously been fully described and no further description of them is deemed necessary.

Synchronous detector 14 comprises a first local oscillator 22 for generating a reference signal, a second mixer circuit 23 connected at its output end to output terminal 11 and at one of its two input ends to first mixer circuit 13. A frequency divider circuit 27 is electrically connected between oscillator 22 and the other of the input ends of second mixer circuit 23. First local oscillator 22 and second mixer circuit 23 are of the type previously described in connection with Fig. 1, with the exception that the local oscillator generates the reference signal at twice the frequency of the suppressed carrier signal. The reason for this will be more apparent from the description of the operation presented below. A frequency divider circuit that may be used in the coherent detector circuit of Fig. 2 is shown and described on pages 594 and 595 of the book entitled "Radio Engineering" by Frederick E. Terman, published in 1947 by the McGraw-Hill Book Co., Inc., New York.

Lock-in circuit 15 comprises a full-wave rectifier 28 electrically connected to the output of first mixer circuit 13 for rectifying the second sweep signal produced by the mixer circuit. A narrow band-pass filter 24 is electrically connected to full-wave rectifier 28 for passing the rectified sweep signal, hereafter referred to as a unidirectional voltage signal, only when it is produced at substantially twice the frequency of the suppressed carrier signal. A threshold detector circuit 25 is electrically connected between filter circuit 24 and gating circuit 17 and, in response to the unidirectional voltage signal, applies a first control signal to the gating circuit.

Lock-in circuit 15 also includes a phase detector circuit 26 of the type previously described which is electrically connected at its input ends between filter circuit 24 and first local oscillator circuit 22 and electrically connected at its output end to reactance tube 20. As previously mentioned, the phase detector compares the phases of the signals applied at its two input ends, namely, the unidirectional voltage signal and the reference signal, to apply a second control signal to the reactance tube 20.

In operation, sweep generator circuit 12 generates a first sweep signal, in the manner previously described, which is applied to first mixer circuit 13. As before, the frequency of the first sweep signal normally periodically varies from $f_1$ to $f_2$. First mixer circuit 13 heterodynes the received double side-band suppressed carrier message signal against the first sweep signal to produce a second sweep signal whose frequency normally periodically varies through a second predetermined band of frequencies $f_3$ to $f_4$, the second band of frequencies, corresponding to the suppressed carrier frequency of the received message signal and including at some instant a frequency equal to the suppressed carrier frequency.

The second sweep signal is applied to full-wave rectifier 28 which rectifies the second sweep signal to produce a unidirectional voltage signal having a periodically recurring spectrum of frequencies. It will be recognized by those skilled in the art that the unidirectional voltage signal will, at some instant during each period, include a frequency equal to twice the suppressed carrier frequency. The unidirectional voltage signal is then applied to filter circuit 24 which passes the voltage signal when it is produced substantially at twice the suppressed carrier frequency. In other words, filter circuit 24, in response to the unidirectional voltage signal, produces a harmonic signal whose frequency is twice that of the suppressed carrier frequency.

This harmonic signal is applied to threshold detector circuit 25 which, in response thereto, produces a first control signal that is applied to gating circuit 17. The first control signal has the effect on gating circuit 17 described above, namely, of closing the gating circuit so that the audio signal generated by audio oscillator 16 is prevented from passing through to reactance tube 20. Accordingly, in response to the first control signal, the frequency of the first sweep signal produced by sweep generator circuit 10 is fixed. As a result, the frequency of the second sweep signal is also fixed, the frequency being fixed at that frequency that will enable filter circuit 24 to thereafter continuously produce the harmonic signal at twice the suppressed carrier frequency.

The harmonic signal is applied to one input end of phase detector circuit 26, the reference signal generated by first local oscillator 22 at twice the suppressed carrier frequency being applied to the other input end of phase detector 26. The phase detector circuit compares the phase of the harmonic signal relative to that of the reference signal and produces a second control signal whose voltage amplitude and sense corresponds to the difference in phase between these two signals. The second control signal is applied to reactance tube 20 and, in response thereto, the phase of the first sweep signal is altered in accordance with the voltage amplitude and sense of the second control signal. Any change in the phase of the first sweep signal is accompanied by a corresponding change in the phase of the second sweep signal. Accordingly, the phase of the second sweep signal is altered until the phase of the harmonic signal exactly matches that of the reference signal, at which time the voltage amplitude of the second control signal is reduced to zero. Thereafter, no further variations occur in the phase of any of these signals.

The reference signal generated by first local oscillator 22 is applied to frequency divider circuit 27 which divides the frequency of the reference signal in half or, stated differently, produces the reference signal at a frequency equal to that of the suppressed carrier frequency. The divided reference signal and the second sweep signal produced by first mixer circuit 13 are applied to second mixer circuit 23 which heterodynes one signal against the other to produce a demodulated output signal at output terminal 11 that faithfully represents the information contained in the received message signal. In other words, the second sweep signal is demodulated by synchronous detector 14, whereby the output signal is produced at output terminal 11.

What is claimed as new is:

1. A coherent detector circuit for searching for message signals transmitted within a predetermined range of frequencies, each message signal having an associated carrier frequency, and for automatically locking in on a received message signal to produce a demodulated output signal representing information contained therein, said circuit comprising: first means for generating a first sweep signal whose frequency normally periodically varies through a first predetermined band of frequencies, said first means being operable in response to first and second control signals for fixing the frequency and phase, respectively, of said first sweep signal; second means electrically connected to said first means for heterodyning the received message signal against said first sweep signal to produce a second sweep signal whose frequency normally periodically varies through a second predetermined band of frequencies corresponding to the carrier frequency associated with the received message signal and including at some instant a predetermined first intermediate frequency, the frequency of said second sweep signal being fixed when the frequency of said first sweep signal is fixed; third means electrically connected to said first means for demodulating said second sweep signal, when the frequency of said second sweep signal is fixed, to produce the output signal, said third means including a local oscillator circuit for generating a reference signal at a second intermediate frequency; and fourth means electrically connected between said second means and said local oscillator circuit and to said first means, said fourth means being responsive to said second sweep signal when said second sweep signal is produced at said first intermediate frequency for applying a first control signal to said first means, the frequency of said first sweep signal being fixed by said first means at that frequency required to cause the frequency of said second sweep signal to be fixed at said first intermediate frequency, said fourth means being responsive to said second sweep signal and to said reference signal for producing a second control signal for shifting the phase of said first sweep signal in accordance with the voltage amplitude of said second control signal, whereby the phase of said second sweep signal may be shifted.

2. A coherent detector circuit for searching a first predetermined band of frequencies for message signals and for automatically locking in on a received message signal to produce a demodulated output signal representing information contained therein, said circuit comprising: lock-in means to produce first and second control signals for fixing the frequency and phase, respectively, of a sweep signal whose frequency normally periodically scans a second predetermined band of frequencies, said first control signal being produced in response to a first intermediate-frequency signal substantially having a predetermined frequency, and said second control signal being produced in response to said first intermediate-frequency signal and a second intermediate-frequency signal having said predetermined frequency, the amplitude of said second control signal varying with the magnitude of the phase angle between said first and second intermediate-frequency signals; a sweep generator circuit for generating said sweep signal, said sweep generator including first means electrically connected to said lock-in means and operable in response to said first control signal for fixing the frequency of said sweep signal to that being generated upon occurrence of said first control signal, and second means electrically connected to said lock-in means and operable in response to said second control signal for shifting the phase of said sweep signal in proportion to the voltage amplitude of said second control signal; a mixer circuit electrically connected to said lock-in means and sweep generator circuit for heterodyning the received message signal against said sweep signal to produce said first intermediate-frequency signal; and a detector circuit electrically connected to said mixer circuit for demodulating said first intermediate-frequency signal to produce the output signal, said detector circuit including an oscillator circuit for generating said second intermediate-frequency signal, said oscillator circuit being electrically connected to said lock-in means for applying said second intermediate-frequency signal thereto.

3. The coherent detector circuit defined in claim 2 wherein said sweep generator circuit includes an audio oscillator circuit for generating an audio signal at a predetermined frequency; a gating circuit electrically connected to said audio oscillator circuit and lock-in means, said gating circuit normally being open for passing said audio signal and being closed in response to said first control signal for preventing passage of said audio signal; and oscillator means electrically connected between said mixer and gating circuits and to said lock-in means, said oscillator means being responsive to said audio and second control signals for producing said sweep signal, the frequency and phase of said sweep signal varying in accordance with the voltage amplitudes of said audio and second control signals, respectively.

4. The coherent detector circuit defined in claim 3 wherein said oscillator means includes a reactance tube electrically connected to said gating circuit and to said lock-in means, and a local oscillator circuit electrically connected between said reactance tube and said mixer circuit.

5. The coherent detector circuit defined in claim 1 wherein said fourth means includes a narrow band-pass filter circuit electrically connected to said second means for passing said second sweep signal when said second sweep signal is produced substantially at said first intermediate frequency, said first and second intermediate frequencies being equal; a first detector circuit electrically connected between said band-pass filter circuit and said first means, said first detector circuit being responsive to the second sweep signal passed by said filter circuit for producing said first control signal; and a second detector circuit electrically connected between said oscillator and filter circuits and to said first means, said second detector circuit being responsive to said reference signal and the second sweep signal passed by said filter circuit for producing said second control signal, the voltage amplitude of said second control signal being proportional to the difference in phase between said reference and second sweep signals.

6. The coherent detector circuit defined in claim 1 wherein said fourth means includes a full-wave rectifier electrically connected to said second means for rectifying said second sweep signal to produce a unidirectional voltage signal having a periodically recurring spectrum of frequencies including, a some instant during each period, a frequency equal to twice said first intermediate frequency and equal to said second intermediate frequency; a narrow band-pass filter circuit electrically connected to said rectifier for passing, in response to said unidirectional signal, a harmonic signal whose frequency is twice that of said first intermediaet frequency; a first detector circuit electrically connected between said filter circuit and said first means, said first detector circuit being responsive to said harmonic signal for producing said first control signal; and a second detector circuit electrically connected between said oscillator and filter circuits and to said first means, said second detector circuit being responsive to said harmonic and reference signals for producing said second control signal, the voltage amplitude of said second control signal being proportional to the difference in phase between said harmonic and reference signals.

7. A coherent detector circuit for searching for message signals transmitted within a predetermined range of frequencies, each message signal having an associated carrier frequency, and for automatically locking in on a received message signal to produce a demodulated output signal representing information contained therein, said detector circuit comprising: a sweep generator circuit for generating a sweep signal whose frequency normally periodically varies through a predetermined band of frequencies, said sweep generator circuit being operable in response to first and second control signals for fixing the frequency and phase, respectively, of said sweep signal; a first mixer circuit electrically connected to said sweep generator circuit for heterodyning the received message signal against said sweep signal to produce a first intermediate-frequency signal at a predetermined intermediate frequency; a local oscillator circuit for generating a second intermedaite-frequency signal at said predetermined intermediate frequency; lock-in means electrically connected between said first mixer and local oscillator circuits and to said sweep generator circuit, said lock-in means being responsive to said first intermediate-frequency signal for producing said first control signal and responsive to said first and second intermediate-frequency signals for producing said second control signal, the voltage amplitude of said second control signal being proportional to the difference in phase between said first and second intermediate-frequency signals, said sweep generator circuit being responsive to said first control signal for fixing the frequency of said sweep signal to that required to maintain said first intermediate-frequency signal at said predetermined intermediate frequency and to said second control signal for shifting the phase of said sweep signal in accordance with the amplitude of said second control signal to reduce the phase difference between said first and second intermediate-frequency signals to zero; and a second mixer circuit electrically connected between said first mixer and local oscillator circuits for heterodyning said first intermediate-frequency signal against said second intermediate-frequency signal to produce the output signal.

8. A coherent detector circuit for searching for message signals transmitted within a predetermined range of frequencies, each message signal having an associated carrier frequency, and for automatically locking in on a received message signal to produce a demodulated output signal representing information contained therein, said detector circuit comprising: an audio oscillator circuit for generating an audio signal at a predetermined frequency; a gating circuit electrically connected to said audio oscillator, said gating circuit being normally open for passing said audio signal and being closed in response to a first control signal for preventing passage of said audio signal; oscillator means electrically connected to said gating circuit and responsive to said audio signal when said gating circuit is open for generating a sweep signal whose frequency varies in accordance with the voltage amplitude of said audio signal, the frequency of said sweep signal being fixed by said oscillator means to that being generated when said gating circuit is closed upon occurrence of the first control signal, said oscillator means being responsive to a second control signal for shifting the phase of said sweep signal in accordance with the voltage amplitude of said second control signal; a first mixer circuit electrically connected to said oscillator means for heterodyning the received message signal against said sweep signal to produce a first intermediate-frequency signal at a predetermined intermediate frequency; a local oscillator circuit for generating a second intermediate-frequency signal at said predetermined intermediate frequency; lock-in means electrically connected between said first mixer and local oscillator circuits and electrically connected to said gating circuit and oscillator means, said lock-in means being responsive to said first intermediate-frequency signal for producing a first control signal and applying said first control signal to said gating circuit and responsive to said first and second intermediate-frequency signals for producing a second control signal and applying said second control signal to said oscillator means, the voltage amplitude of said second control signal being proportional to the difference in phase between said first and second intermediate-frequency signals; and a second mixer circuit electrically connected between said first mixer and local oscillator circuits for heterodyning said first intermediate-frequency signal against said second intermediate-frequency signal to produce the output signal.

9. A coherent detector circuit for searching for message signals transmitted within a predetermined range of frequencies, each message signal having an associated carrier frequency, and for automatically locking in on a received message signal to produce a demodulated output signal representing information contained therein, said detector circuit comprising: an audio oscillator circuit for generating an audio signal at a predetermined frequency; a gating circuit electrically connected to said audio oscillator, said gating circuit being normally open for passing said audio signal and being closed in response to a first control signal for preventing passage of said audio signal; oscillator means electrically connected to said gating circuit and responsive to said audio signal when said gating circuit is open for generating a first sweep signal whose frequency periodically varies through a first band of frequencies in accordance with the voltage amplitude of said audio signal, the frequency of said first sweep signal being fixed by said oscillator means to that being generated when said gating circuit is closed upon occurrence of said first control signal, said oscillator means being responsive to a second control signal for shifting the phase of said first sweep signal in accordance with the voltage amplitude of said second control signal; a first mixer circuit electrically connected to said oscillator means for heterodyning the received message signal against said first sweep signal to produce a second sweep signal whose frequency normally periodically varies through a second predetermined band of frequencies corresponding to the carrier frequency of the received message signal and including a predetermined intermediate frequency, the frequency of said second sweep signal being fixed when the frequency of said first sweep signal is fixed; a narrow band-pass filter circuit electrically connected to said first mixer circuit for passing said second sweep signal when said second sweep signal is produced substantially at said intermediate frequency; a first detector circuit electrically connected between said filter and gating circuits, said first detector circuit being responsive to the second sweep signal passed by said filter circuit for applying said first control signal to said gating circuit; a local oscillator circuit for generating a reference signal at said predetermined intermediate frequency; a second detector circuit electrically connected between said filter and local oscillator circuits and to said oscillator means, said second detector circuit being responsive to said reference signal and the second sweep signal passed by said filter circuit to produce said second control signal, the voltage amplitude of said second control signal being proportional to the difference in phase between said reference and second sweep signals; and a second mixer circuit electrically connected between said first mixer and local oscillator circuits for heterodyning said second sweep signal against said reference signal to produce the output signal.

10. A coherent detector circuit for searching for message signals transmitted within a predetermined range of frequencies, each message signal having an associated carrier frequency, and for automatically locking in on a received message signal to produce a demodulated output signal representing information contained therein, said circuit comprising: a sweep generator circuit for generating a sweep signal whose frequency normally periodically varies through a predetermined band of frequencies, said sweep generator circuit being operable in response to a first control signal for fixing the frequency of said sweep signal and to a second control signal for shifting the phase of said sweep signal until the voltage amplitude of said second control signal is reduced to zero; a first mixer circuit electrically connected to said sweep generator circuit for heterodyning the received message signal against said sweep signal to produce a first intermediate-frequency signal at a predetermined first intermediate frequency; a local oscillator circuit for generating a second intermediate-frequency signal at a frequency equal to twice the first intermediate frequency; lock-in means electrically connected between said first mixer and local oscillator circuits and to said sweep generator circuit, said lock-in means being responsive to said first intermediate-frequency signal for producing a first control signal and applying said first control signal to said sweep generator circuit and responsive to said first and second intermediate-frequency signals for producing a second control signal and applying said second control signal to said sweep generator circuit, said first control signal rendering said sweep generator circuit operable for fixing the frequency of said sweep signal to that required to maintain said first intermediate-frequency signal at said predetermined first intermediate frequency and said second control signal rendering said sweep generator circuit operable for shifting the phase of said sweep signal in accordance with the voltage amplitude of said second control signal; a frequency-divider circuit electrically connected to said local oscillator circuit for dividing the frequency of said second intermediate-frequency signal in half to produce said second intermediate-frequency signal at said first intermediate frequency, said second intermediate-frequency signal being in phase with said first intermediate-frequency signal; and a second mixer circuit electrically connected to siad first mixer and frequency-divider circuits for heterodyning said first intermediate-frequency signal against said divided second intermediate-frequency signal to produce the output signal.

11. A coherent detector circuit for searching for message signals transmitted within a predetermined range of frequencies, each message signal having an associated carrier frequency, and for automatically locking in on a received message signal to produce a demodulated output signal representing information contained therein; said circuit comprising: an audio oscillator circuit for generating an audio signal at a predetermined frequency; a gating circuit electrically connected to said audio oscillator, said gating circuit being normally open for passing said audio signal and being closed in response to a first control signal for preventing passage of said audio signal; oscillator means electrically connected to said gating circuit and responsive to said audio signal when said gating circuit is open for generating a first sweep signal whose frequency periodically varies through a first band of frequencies in accordance with the voltage amplitude of said audio signal, the frequency of said first sweep signal being fixed by said oscillator means to that being generated when said gating circuit is closed upon occurrence of said first control signal, said oscillator means being responsive to a second control signal for shifting the phase of said first sweep signal in accordance with the voltage amplitude of said second control signal until the voltage amplitude is reduced to zero; a first mixer circuit electrically connected to said oscillator means for heterodyning the received message signal against said first sweep signal to produce a second sweep signal whose frequency normally periodically varies through a second predetermined band of frequencies corresponding to the carrier frequency of the received message signal and including a predetermined intermediate frequency, the frequency of said second sweep signal being fixed when the frequency of said first sweep signal is fixed; a local oscillator circuit for generating a reference signal at twice said intermediate frequency; lock-in means electrically connected between said first mixer and local oscillator circuits and to said gating circuit and oscillator means, said lock-in means being responsive to said second sweep signal when said second sweep signal is produced at said intermediate frequency for producing a second control signal and applying said first control signal to said gating circuit and responsive to said second sweep and reference signals for producing a second control signal and applying said second control signal to said oscillator means; a frequency-divider circuit electrically connected to said local oscillator for dividing the frequency of said reference signal in half to produce said reference signal at said intermediate frequency; and a second mixer circuit electrically connected to said first mixer and frequency-divider circuits for heterodyning said second sweep signal fixed at said intermediate frequency against said divided reference signal to produce the output signal.

12. A coherent detector circuit for searching for message signals transmitted within a predetermined range of frequencies, each message signal having an associated carrier frequency, and for automatically locking in on a received message signal to produce a demodulated output signal representing information contained therein, said circuit comprising: a sweep generator circuit for generating a first sweep signal whose frequency normally periodically varies through a first predetermined band of frequencies, said sweep generator circuit being operable in response to a first control signal for fixing the frequency of said sweep signal and in response to a second control signal for shifting the phase of said sweep signal in accordance with the voltage amplitude of said second control signal until the voltage amplitude is reduced to zero; a first mixer circuit electrically connected to said sweep generator circuit for heterodyning the received message signal against said first sweep signal to produce a second sweep signal whose frequency normally periodically varies through a second predetermined band of frequencies corresponding to the carrier frequency of the received message signal and including a predetermined intermediate frequency, the frequency of said second sweep signal being fixed when the frequency of said first sweep signal is fixed; a full-wave rectifier electrically connected to said first mixer circuit for rectifying said second sweep signal to produce a unidirectional voltage signal having a periodically recurring spectrum of frequencies including, at some instant during each period, a frequency equal to twice said intermediate frequency; a narrow band-pass filter circuit electrically connected to said rectifier for passing, in response to said unidirectional signal, a harmonic signal whose frequency is twice that of said intermediate frequency; a first detector circuit electrically connected between said filter and sweep generator circuits and responsive to said harmonic signal for producing said first control signal; a local oscillator circuit for generating a reference signal at twice said intermediate frequency; a second detector circuit electrically connected between said filter and local oscillator circuits and to said sweep generator circuit, said second detector circuit being responsive to said harmonic and reference signals for producing said second control signal, the voltage amplitude of said second control signal being proportional to the difference in phase between said harmonic and reference signals; a frequency-divider circuit electrically connected to said local oscillator circuit for dividing the frequency of said reference signal in half to produce said reference signal at said intermediate frequency; and a second mixer circuit electrically connected to said first mixer and frequency-divider circuits for heterodyning said second sweep signal fixed at said intermediate frequency against said divided reference signal to produce the output signal.

13. A coherent detector circuit for searching for message signals transmitted within a predetermined range of frequencies, each message signal having an associated carrier frequency, and for automatically locking in on a received message signal to produce a demodulated output signal representing information contained therein, said circuit comprising: an audio oscillator circuit for generating an audio signal at a predetermined frequency; a gating circuit electrically connected to said audio oscillator, said gating circuit being normally open for passing said audio signal and being closed in response to a first control signal for preventing passage of said audio signal; oscillator means electrically connected to said gating circuit and responsive to said audio signal when said gating circuit is open for generating a first sweep signal whose frequency periodically varies through a first predetermined band of frequencies in accordance with the voltage amplitude of said audio signal, the frequency of said first sweep signal being fixed by said oscillator means to that being generated when said gating circuit is closed upon occurrence of said first control signal, said oscillator means being responsive to a second control signal for shifting the phase of said first sweep signal in accordance with the voltage amplitude of said second control signal until the voltage amplitude is reduced to zero; a first mixer circuit electrically connected to said oscillator means for heterodyning the received message signal against said first sweep signal to produce a second sweep signal whose frequency normally periodically varies through a second predetermined band of frequencies corresponding to the carrier frequency of the received message signal and including a predetermined intermediate frequency, the frequency of said second sweep signal being fixed when the frequency of said first sweep signal is fixed; a full-wave rectifier electrically connected to said first mixer circuit for rectifying said second sweep signal to produce a unidirectional voltage signal having a periodically recurring spectrum of frequencies including, at some instant during each period, a frequency equal to twice said intermediate frequency; a narrow band-pass filter circuit electrically connected to said rectifier for passing, in response to said unidirectional signal, a harmonic signal whose frequency is twice that of said intermediate frequency; a first detector circuit electrically connected between said filter and gating circuits and responsive to said harmonic signal for producing said first control signal; a local oscillator circuit for generating a reference signal at twice said intermediate frequency; a second detector circuit electrically connected between said filter and local oscillator circuits and to said oscillator means, said second detector circuit being responsive to said harmonic and reference signals for producing said second control signal, the voltage amplitude of said second control signal being proportional to the difference in phase between said harmonic and reference signals; a frequency-divider circuit electrically connected to said local oscillator circuit for dividing the frequency of said reference signal in half to produce said reference signal at said intermediate frequency; and a second mixer circuit electrically connected to said first mixer and frequency-divider circuits for heterodyning said second sweep signal fixed at said intermediate frequency against said divided reference signal to produce the output signal.

References Cited in the file of this patent

UNITED STATES PATENTS

| | | |
|---|---|---|
| 2,287,925 | White | June 30, 1942 |
| 2,623,177 | Hugenhultz | Dec. 23, 1952 |
| 2,743,362 | Leed | Apr. 24, 1956 |